Patented Feb. 22, 1949

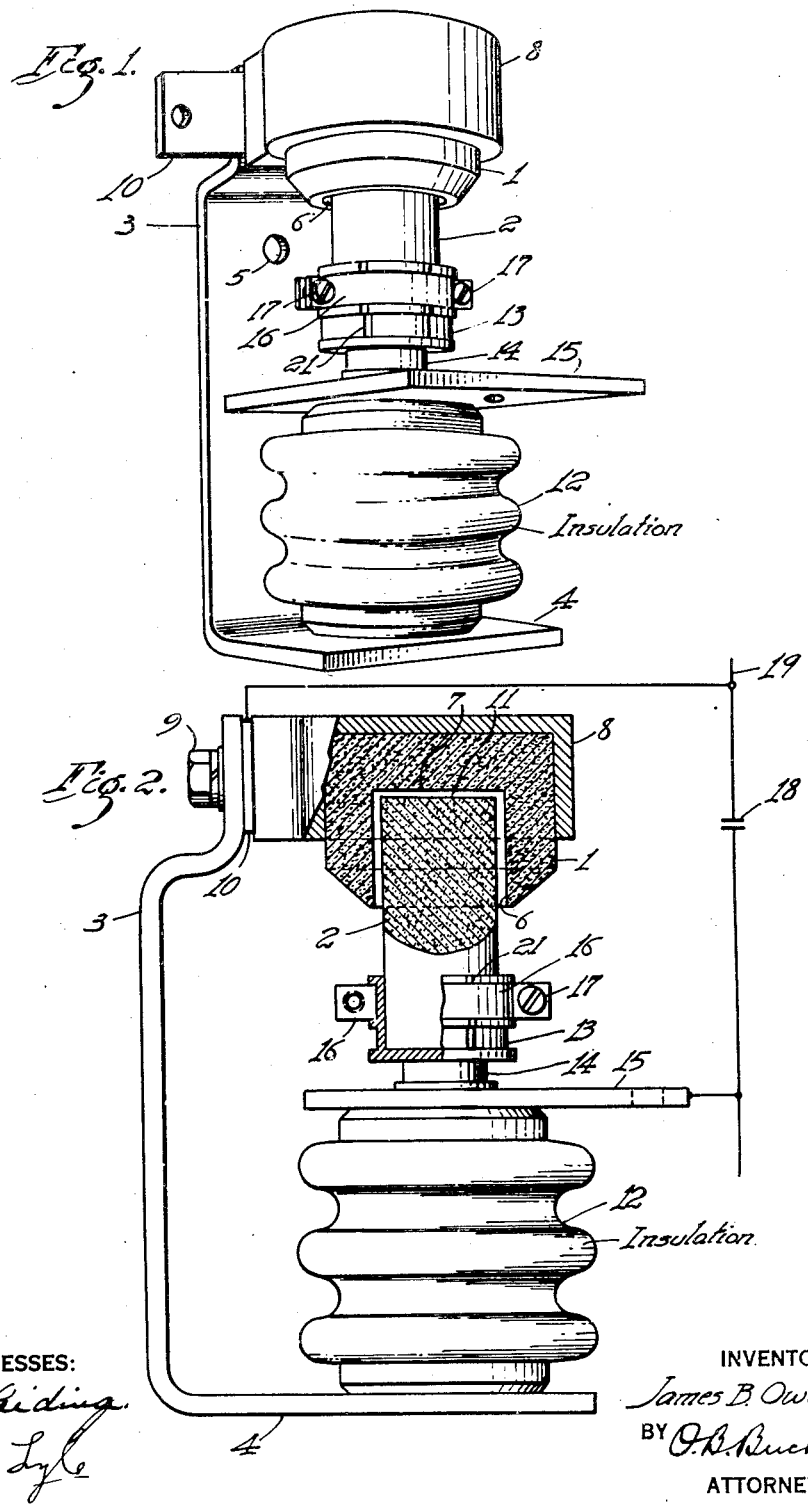

2,462,219

UNITED STATES PATENT OFFICE 2,462,219

SPARK GAP DEVICE

James B. Owens, Pittsburgh, Pa., assignor to Westinghouse Electric Corporation, East Pittsburgh, Pa., a corporation of Pennsylvania Application November 28, 1945, Serial No. 631,397

3 Claims. (Cl. 175—30)

The present invention relates to protective spark gap devices, and more particularly to a gap device which is capable of maintaining a stable arc, and of discharging relatively high currents.

The gap device of the present invention is particularly intended for use as a protective device for series capacitors, although it will be obvious that its usefulness is not necessarily restricted to this particular application. Series capacitors are connected in series in electrical distribution or transmission lines to neutralize part or all of the inductive reactance, and thus to improve the voltage regulation, or increase the power limits, of such lines. Since such capacitors are connected in series and carry the line current, the voltage across the capacitor is proportional to the current, and the capacitor may be subjected to dangerous overvoltages in case of a short circuit, or an abnormal overload. It is not practical to use capacitors which are capable of withstanding the maximum voltage that may occur under fault conditions, because of their cost, and series capacitor installations, therefore, usually consist of capacitors having a voltage rating based on the voltage across the capacitors under normal conditions, together with protective equipment for by-passing the capacitors when an overvoltage occurs.

Since the protective equipment for series capacitors must operate substantially instantaneously upon the occurrence of a voltage in excess of a predetermined value, in order to protect the capacitor, it is customary to use spark gaps for this purpose, the gap being connected directly across the capacitor, either alone or in combination with a trigger circuit for initiating the discharge, depending upon the maximum voltage which is to be permitted across the capacitor. A spark gap device intended for this use must have a low arc voltage, or voltage drop across the arc, even when discharging very heavy currents, in order to keep the voltage across the protected capacitor low. Such a gap device must also be capable of maintaining a stable arc which will restrike immediately after a current zero, so as to prevent the occurrence of voltage peaks on the capacitor. It has been found that so-called self-clearing gaps, in which the arc goes out after a current zero and does not restrike until the voltage reaches a value comparable to the voltage which was originally needed to establish the arc, are not suitable for series capacitor protection, since they permit a voltage peak to occur each half-cycle, which is detrimental to the capacitor. Furthermore, with such gaps the capacitor is partly charged on each half-cycle, and discharges when the arc restrikes, and these repeated heavy discharge currents cause undesirable heating of the capacitor. For these reasons, a gap device for series capacitor protection must be capable of maintaining a stable arc which does not permit voltage peaks to occur.

A further requirement is that the gap must be capable of carrying heavy discharge currents for appreciable lengths of time without damage to the gap, in order to protect the capacitor for as long as the overvoltage continues. Even when the gap is used in combination with a contactor, or circuit breaker, to by-pass both the gap and capacitor, as is often done, a certain length of time is required for the contactor to close, and the gap must carry the full short-circuit current for at least several cycles, and in many cases for a considerably longer time.

Gap devices having massive carbon electrodes have been used for series capacitor protection, since such gaps have a low arc voltage and can discharge heavy currents. Such gaps are also theoretically capable of maintaining a stable arc, but in the usual construction the forces acting on the arc tend to affect its stability. Thus, both the magnetic forces produced by the current through the gap, and the thermal air currents caused by the heat of the arc, tend to move the arc out of the gap between the electrodes. In the usual open construction, random air currents may also tend to move the arc out of the gap. When this occurs, the arc is lengthened and the arc voltage increased, thus increasing the voltage across the capacitor, and the arc is either extinguished, leaving the capacitor unprotected, or transfers to other adjacent equipment, often with destructive effects. Troubles of this character have been encountered in service with gaps of conventional construction, and tests have indicated that with such gaps the arc is likely to be blown out of the gap if the discharge continues for more than a few cycles.

The principal object of the present invention is to provide a protective spark gap device which is capable of maintaining a stable arc with low arc voltage, and which is capable of carrying heavy discharge currents for long periods without being damaged.

A further object of the invention is to provide a protective gap device in which the forces acting on the arc tend to keep it centered between the electrodes, and in which the arc is protected from air currents, so that a stable arc is readily maintained for relatively long periods of time.

A more specific object of the invention is to provide a protective gap device in which the configuration of the electrodes is such that the arc is held in the gap and is protected against air currents, so that a stable arc is readily maintained and heavy currents can be discharged for a considerable length of time without damage to the gap and without danger of the arc being blown out of the gap.

Other objects and advantages of the invention will be apparent from the following detailed description of a preferred embodiment of the invention, taken in connection with the accompanying drawing, in which:

Fig. 1 is a perspective view of a spark gap device embodying the invention; and

Fig. 2 is a side elevation, partly in section, of the gap device, also showing diagrammatically the equipment with which the gap is associated in use.

The gap device shown in the drawing consists essentially of an upper electrode 1 and a lower electrode 2, supported on a supporting member or bracket 3. The supporting member 3 is a vertical metal bracket member with a horizontal lower portion 4, and the bracket 3 may have suitable holes 5 for mounting the bracket on a supporting structure.

The electrodes 1 and 2 are preferably made of carbon, since a carbon gap is capable of maintaining a stable arc, with a low arc voltage, so that the arc restrikes immediately after a current zero, and no voltage peaks are permitted to occur. Carbon also has the advantage of being capable of discharging very heavy currents without damage to the arcing surfaces, because of its property of subliming rather than liquefying at the high temperatures of the arc terminals. It is to be understood, however, that although carbon is the preferred material for the electrodes, any other refractory conducting material which is capable of maintaining a stable arc with a low arc voltage, and of discharging heavy currents might be used.

As shown in Fig. 2, the upper electrode 1 is a massive carbon member with a generally cylindrical hollow 6, the hollow having a plane inner surface 7. Thus, the electrode 1 is a generally cup-shaped member, and it is supported in inverted position with the hollow 6 opening downward and the plane surface 7 horizontal. The electrode 1 is supported in a holder 8 of bronze, or any other suitable metal, which is preferably cast in place around the electrode. The holder 8 is mounted on the upper end of the bracket 3 in any suitable manner, as by means of screws 9 threaded into the holder, and a bar or plate 10 of copper is clamped between the holder 8 and the bracket 3 to serve as a terminal member for connecting a conductor to the upper electrode 1.

The lower electrode 2 is a rod-like, cylindrical carbon member having a substantially plane upper surface 11. The lower electrode 2 is supported on a porcelain insulator 12 which is mounted on the horizontal portion 4 of the bracket 3 directly under the upper electrode 1. The lower electrode 2 is held in a metal electrode holder 13 which is mounted on the top of insulator 12 in any suitable manner. Preferably, the electrode holder 13 has a threaded portion threaded into the top of the insulator 12, with a lock nut 14 for securing the electrode holder in place. A copper bar or plate 15 is clamped between the electrode holder 13 and the insulator 12 to serve as a terminal member for connecting a conductor to the lower electrode 2. The upper part of the electrode holder 13 is of large enough diameter to accommodate the electrode 2, and it has a plurality of saw cuts or slots 21 in its vertical wall, so as to divide the wall into a plurality of more or less resilient portions. The lower electrode 2 is clamped in the electrode holder 13 by means of clamping members 16, which are clamped around the electrode holder 13 and held together by screws 17.

The lower electrode 2 is of smaller diameter than the hollow 6 in the upper electrode 1, and it extends vertically upward into the hollow 6 with its plane upper surface 11 spaced from the plane horizontal surface 7 of the electrode 1. The diameter of the electrode 2 is preferably made such that the width of the annular space between the electrodes is slightly greater than the spacing between the surfaces 7 and 11, so that an arc between the electrodes will always start between the surfaces 7 and 11 rather than between the cylindrical surfaces.

Upon the occurrence of a predetermined voltage across the electrodes 1 and 2, the gap will break down, and an arc will be established between the opposed surfaces 7 and 11. Since this arc is within the hollow of the upper electrode 1, it is protected from the disturbing effects of random air currents, or of thermal air currents caused by the heat of the arc, since any air currents which reach the arc can reach it only by rising through the annular clearance between the two electrodes. Thus, the possibility of the arc being blown out of the gap by air currents is eliminated, since it is positively shielded from such currents by the upper electrode 1. The upper electrode 1 also confines the hot, ionized arc gases and carbon vapor within the hollow 6, and in the arcing space between the surfaces 7 and 11, so that the space between the arcing surfaces remains ionized and a stable arc is readily maintained. The current flowing to the arc through the upper electrode 1 flows in a generally radial direction, and the magnetic forces produced by this current are in such a direction that they tend to move the arc towards the center of the arcing space, thus holding the arc in the desired location. It will be apparent, therefore, that the configuration of the electrodes is such that the arc is positively maintained in the desired location, and there is no possibility of the arc being blown out of the gap, since all the forces acting on the arc tend to keep it in the gap, and it is positively shielded against stray air currents or other external influences.

It will be seen, therefore, that a spark gap device is provided which meets the requirements outlined above in a very effective manner. The new gap device is capable of carrying heavy discharge currents for a considerable length of time without damage because of its massive carbon electrodes, which have high thermal capacity, and which can safely withstand relatively high temperatures. The carbon electrodes of the gap are inherently capable of maintaining a stable arc which is not easily extinguished, and this characteristic is enhanced by the action of the hollow upper electrode in confining the ionized arc gases and carbon vapor so as to keep the arcing space filled with hot, ionized gases. Since the arc is completely protected from any forces tending to move it out of the gap, and since all the forces which act on the arc tend to hold it within the gap, it will be apparent that there is no possibility of the arc being blown out of the gap, even if it persists for a considerable length of time. Thus, a protective spark gap device has been provided which is very well suited for series capacitor protection, and for other similar applications where similar requirements must be met.

In the use of this gap device for protecting series capacitors against overvoltages, the gap device is connected directly across the capacitor to be protected, as shown in Fig. 2. The capacitor 18 is connected in series in an alternating current line 19 to neutralize part or all of the inductive reactance of the line. Since the capacitor 18 carries the line current, it may be subjected to dangerous overvoltages in case of a fault on the line, and the gap device is connected across the capacitor to protect it. It will be apparent that if the voltage across the capacitor rises above the value for which the gap is set, the gap will arc over and bypass the capacitor, so that the voltage across the capacitor will be only the arc voltage, which is quite low even when very heavy currents are being discharged, and the capacitor is protected against dangerous voltages. Obviously, the new gap device may also be used in more elaborate protective circuits, the simple arrangement shown being only illustrative.

It is to be understood that although a preferred embodiment of the invention has been shown and described for the purpose of illustration, the invention is not limited to the particular details of construction shown, but in its broadest aspects it includes all equivalent embodiments and modifications which come within the scope of the appended claims.

I claim as my invention:

1. A protective spark gap device adapted to maintain a stable arc and to discharge heavy currents for an appreciable length of time without damage, said spark gap device comprising a massive, generally cup-shaped carbon electrode having a generally cylindrical hollow therein, means for supporting said cup-shaped electrode in inverted position with said hollow opening downwards and open to the atmosphere, a massive generally cylindrical carbon electrode of greater length than the depth of said hollow and of smaller diameter than said hollow, and means for supporting said cylindrical electrode coaxially with the hollow of the cup-shaped electrode and with its upper end extending into the hollow and spaced from the cup-shaped electrode within the hollow to form a spark gap therein.

2. A protective spark gap device adapted to maintain a stable arc and to discharge heavy currents for an appreciable length of time without damage, said spark gap device comprising a massive, generally cup-shaped carbon electrode having a generally cylindrical hollow therein, a supporting bracket member, means for supporting said cup-shaped electrode on said bracket member in inverted position with said hollow opening downwards and open to the atmosphere, a massive, generally cylindrical carbon electrode of greater length than the depth of said hollow and of smaller diameter than the hollow, an insulator mounted on the bracket member, and means for supporting said cylindrical electrode on the insulator coaxially with the hollow of the cup-shaped electrode and with its upper end extending into the hollow and spaced from the cup-shaped electrode within the hollow to form a spark gap therein.

3. A protective spark gap device adapted to maintain a stable arc and to discharge heavy currents for an appreciable length of time without damage, said spark gap device comprising a massive, generally cup-shaped carbon electrode having a generally cylindrical hollow therein, a metal holder partially enclosing said cup-shaped electrode and in electrical contact therewith, terminal means for effecting electrical connection to said holder, a supporting bracket member, means for securing the holder on said bracket member with the hollow of the cup-shaped electrode opening downwards and open to the atmosphere, an insulator mounted on the bracket member, an electrode holder supported on said insulator, terminal means for effecting electrical connection to said last-mentioned electrode holder, a massive, generally cylindrical carbon electrode of greater length than the depth of the hollow in the cup-shaped electrode and of smaller diameter than said hollow, said cylindrical electrode being supported in the last-mentioned electrode holder coaxially with the hollow of the cup-shaped electrode and with its upper end extending into the hollow and spaced from the cup-shaped electrode within the hollow to form a spark gap therein.

JAMES B. OWENS.

REFERENCES CITED

The following references are of record in the file of this patent:

UNITED STATES PATENTS

| Number | Name | Date |
| --- | --- | --- |
| 532,814 | Penton et al. | Jan. 22, 1895 |
| 865,291 | Bell | Sept. 3, 1907 |
| 2,003,298 | Lemmon | June 4, 1935 |
| 2,164,720 | Pittman | July 4, 1939 |

FOREIGN PATENTS

| Number | Country | Date |
| --- | --- | --- |
| 557,194 | Germany | Aug. 19, 1932 |